United States Patent [19]
Ishiguro et al.

[11] Patent Number: 5,883,958
[45] Date of Patent: Mar. 16, 1999

[54] METHOD AND DEVICE FOR DATA DECRYPTION, A METHOD AND DEVICE FOR DEVICE IDENTIFICATION, A RECORDING MEDIUM, A METHOD OF DISK PRODUCTION, AND A METHOD AND APPARATUS FOR DISK RECORDING

[75] Inventors: Ryuji Ishiguro, Tokyo; Yoshitomo Osawa, Kanagawa, both of Japan

[73] Assignee: Sony Corporation, Tokyo, Japan

[21] Appl. No.: 823,176

[22] Filed: Mar. 26, 1997

[30] Foreign Application Priority Data

Apr. 1, 1996 [JP] Japan .................................. 8-078647
Jun. 10, 1996 [JP] Japan .................................. 8-147272

[51] Int. Cl.$^6$ ........................................................ H04K 1/00
[52] U.S. Cl. ................................... 380/4; 380/30; 380/20
[58] Field of Search ................................. 380/4, 5, 9, 20, 380/23, 30, 21, 44

[56] References Cited

U.S. PATENT DOCUMENTS 5,796,839   8/1998   Ishiguro ........................................ 380/44
5,802,174   9/1998   Sako et al. ..................................... 380/4

*Primary Examiner*—David Cain
*Attorney, Agent, or Firm*—Frommer Lawrence & Haug LLP; William S. Frommer

[57] ABSTRACT

A video disk playback apparatus includes a disk driver which retrieves video data and a key data table from a digital video disk, and a decoder board which has its own ID. The disk driver receives the ID from the decoder board, verifies the ID, selects key data based on it, calculates a first datum from the selected key data, and sends the datum to the decoder board. The decoder board calculates a second datum from the key data and first datum, and returns the second datum to the disk driver. The disk driver verifies the second datum, produces an encryption key, encrypts the video data based on it, and feeds the encrypted video data to the decoder board. The decoder board calculates a decryption key from the first datum, decrypts the video data based on it, and decodes the decrypted video data for display.

23 Claims, 13 Drawing Sheets

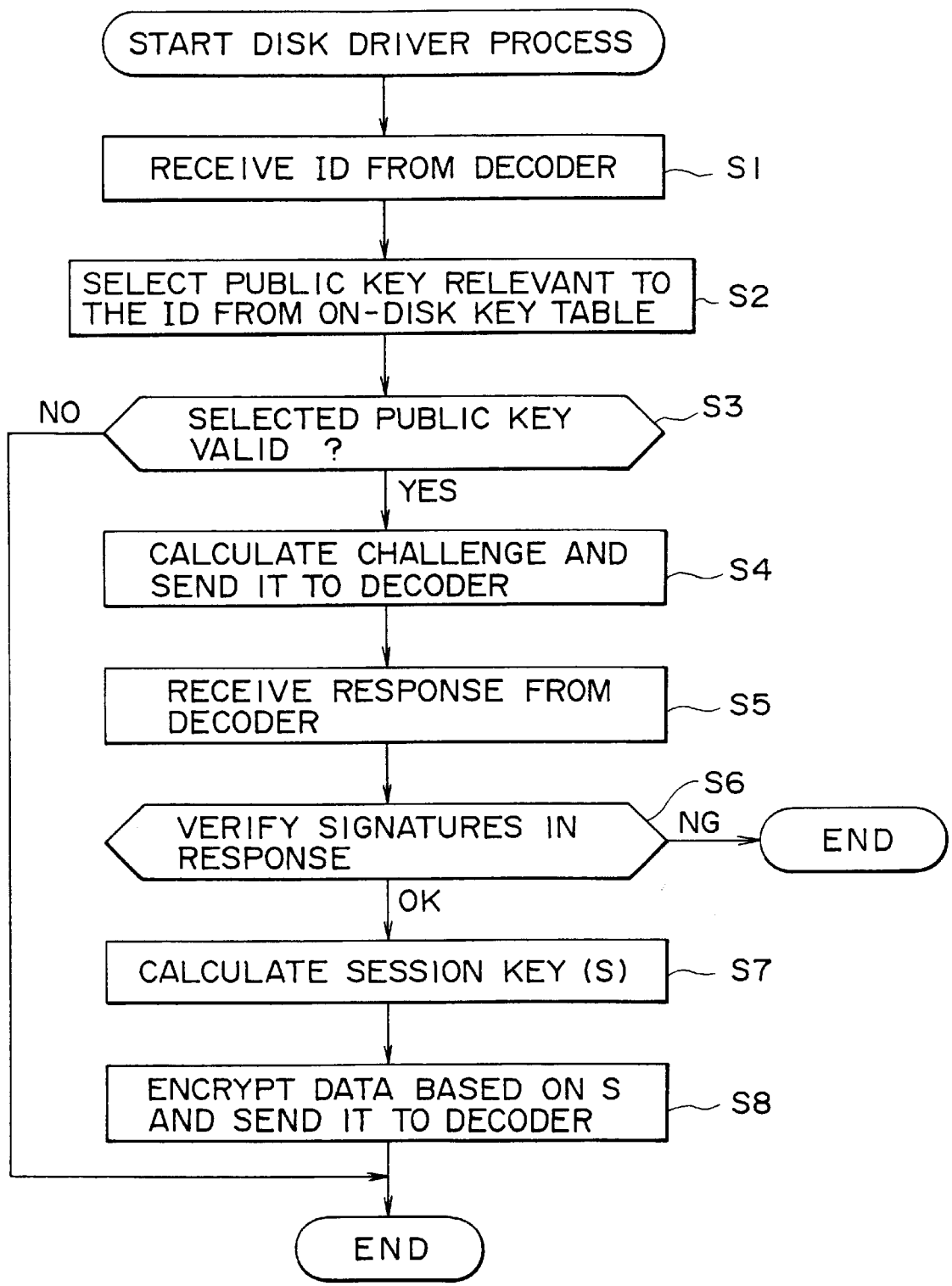

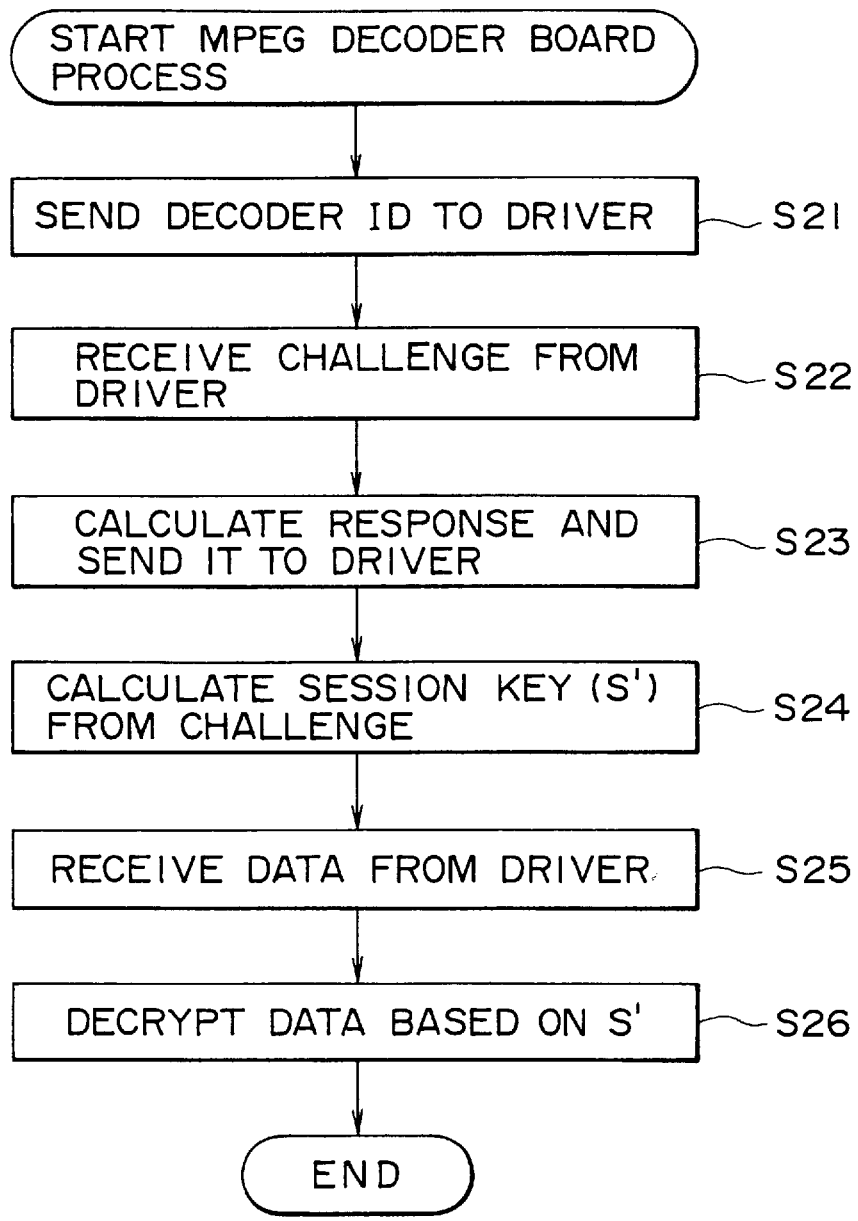

FIG. 4

| DISK DRIVER | | MPEG DECODER BOARD |
|---|---|---|
| | $\beta = \alpha^n \bmod p : p$ is a prime number, $\alpha \varepsilon Z_p^+$ | |
| | public key : $(\alpha, \beta, p)$ | |
| | private key : n | |
| | Request Challenge (ID) ———→ | ID |
| <choose public key> | | |
| <select random number k1> | ←——— Challenge (C) ——— | <select random number k2, (k2, p−1) = 1> |
| $C = \alpha^k \bmod p$ | | $r = \alpha^{k2} \bmod p$ |
| | | $d = (C - n \cdot r)k2^{-1} \bmod (p-1)$ |
| | ——— Response (r, d) ———→ | $S' = C^{k2} = (\alpha^{k1})^{k2} \bmod p$ |
| <verify signature> | | |
| $\beta^r \cdot r^d = \alpha^c \bmod (p)$ | | |
| $S = r^{k1} = (\alpha^{k2})^{k1} \bmod p = S'$ | | |

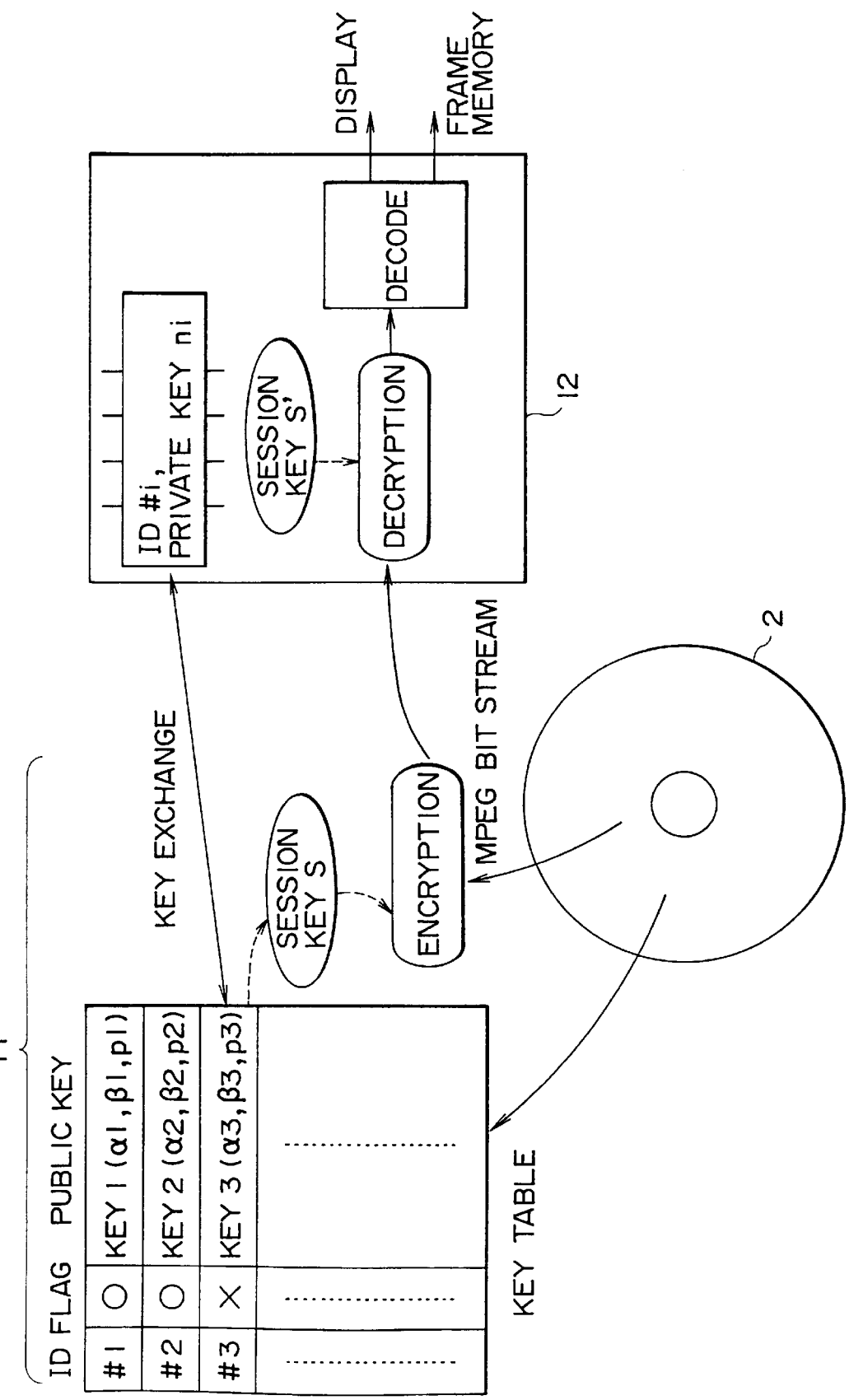

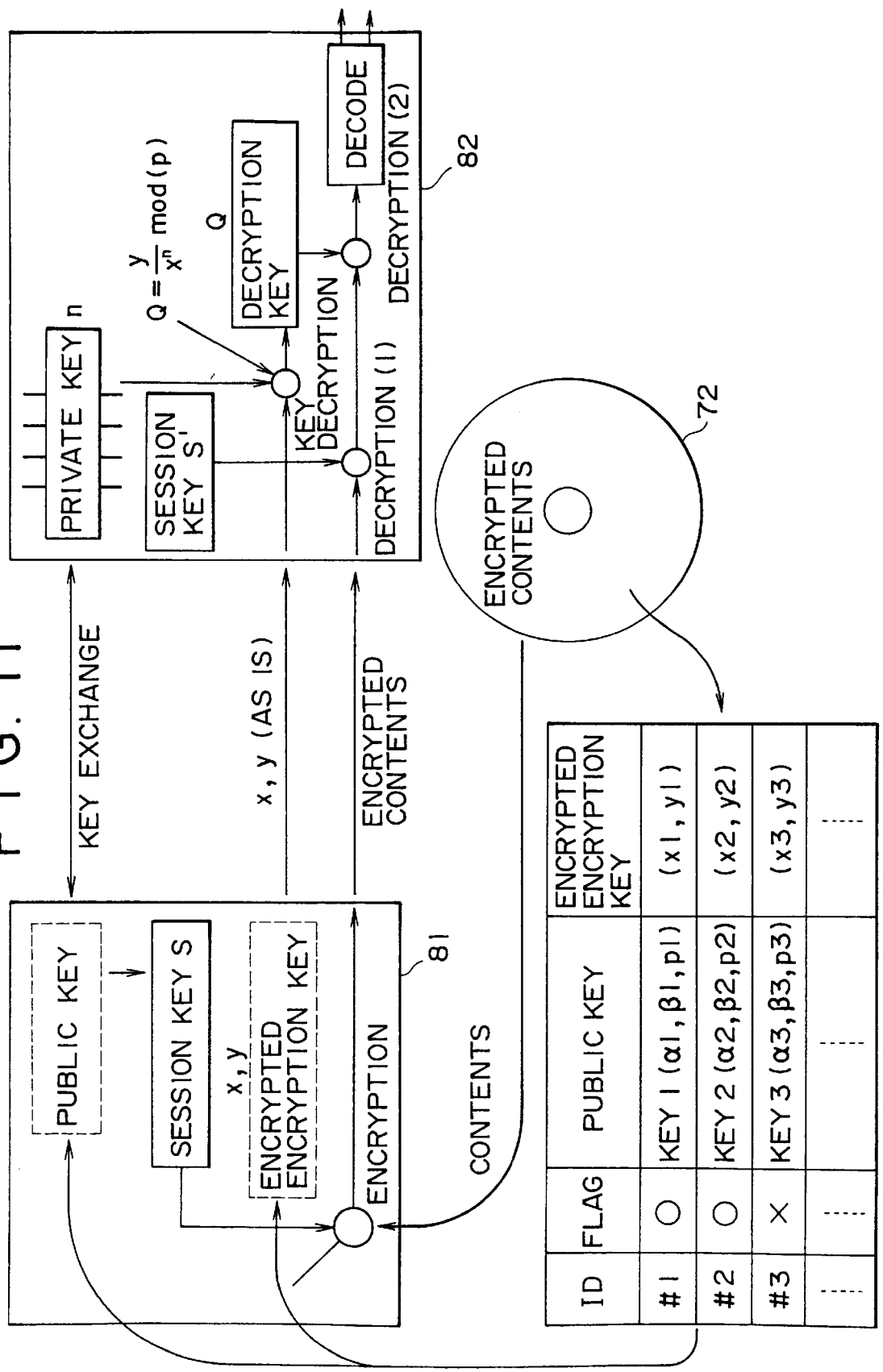

FIG. 12

DISK DRIVER  MPEG DECODER BOARD $\beta = \alpha^n \bmod p : p$ is a prime number, $\alpha \in Z_p^+$
public key : $(\alpha, \beta, p)$
private key : n Request Challenge (ID) →

⟨choose public key⟩

ID

⟨select random number k1⟩
$C = \alpha^k \bmod p$

Challenge (C) →

⟨select random number k2, (k2, p−1) = 1⟩
$r = \alpha^{k2} \bmod p$
$d = (C - n \cdot r)k2^{-1} \bmod (p-1)$ ← Response (r, d)

⟨verify signature⟩
$\beta^r \cdot r^d = \alpha^c \bmod (p)$ $S = r^{k1} = (\alpha^{k2})^{k1} \bmod p = S'$ $S' = C^{k2} = (\alpha^{k1})^{k2} \bmod p = S$ x, y →

$Q = \dfrac{y}{x^n} \bmod (p)$

KEY TABLE

| ID | FLAG | ENCRYPTED ENCRYPTION KEY |
|---|---|---|
| #1 | ○ | (x1, y1) |
| #2 | ○ | (x2, y2) |
| #3 | × | (x3, y3) |
| ⋮ | ⋮ | ⋮ |

METHOD AND DEVICE FOR DATA DECRYPTION, A METHOD AND DEVICE FOR DEVICE IDENTIFICATION, A RECORDING MEDIUM, A METHOD OF DISK PRODUCTION, AND A METHOD AND APPARATUS FOR DISK RECORDING

BACKGROUND OF THE INVENTION

1. Field of the Invention

The present invention relates to a method and device for data decryption, a method and device for device identification, a recording medium, a method of disk production, and a method and apparatus for disk recording, and particularly to a method and device for data decryption, a method and device for device identification, a recording medium, a method of disk production, and a method and apparatus for disk recording which are all intended to decrypt encrypted data protectively.

2. Description of Related Art

Recently, the format of digital video disk (will be termed "DVD" hereinafter) is going to be standardized, and DVDs are expected to take the place of conventional analog video disks. With the intention for long-time recording, video data is recorded on a DVD by being rendered the compressed encoding, e.g., based on the MPEG (Moving Picture Expert Group) scheme that will be dealt with exclusively in the following explanation. Accordingly, a record of data needs to be decoded at the time of playback.

It becomes possible, by the way, for a DVD owing to the digital recording of video data to produce its copies on other recording mediums at virtually the same output quality as the original DVD. Namely, there is a possibility of such an illegal conduct as manufacturing a stamper by leading video data out of the data path between the disk driver and MPEG decoder and producing illegitimate copy disks in large scale from it. Another possibility is manufacturing a stamper by decoding video data reproduced by the disk driver with an imitated MPEG decoder and producing illegitimate copy disks in large scale from it.

As a conceivable manner of precluding the illegal copy of DVDs and the use of imitated MPEG decoders, video data reproduced by the disk driver is encrypted based on an encryption key and fed to the MPEG decoder upon judging the legitimacy of the MPEG decoder. The MPEG decoder decrypts the encrypted video data by using the encryption key and thereafter decodes the encoded video data.

Based on this counter measure against the illegal conduct, video data reproduced by the disk driver is not fed to the MPEG decoder unless it is a legitimate device, whereby the illegal copy of DVDs and the use of imitated MPEG decoders can be precluded. Even if the disk driver is accessed with an imitated MPEG decoder and reproduced video data is led out, the encrypted data cannot be used intact, and accordingly DVDs are protected from being copied practically.

However, the conventional scheme of encryption of video data based on a simple encryption key before it is fed to the MPEG decoder by which reproduced and encrypted video data is decrypted is susceptible to breaking of encryption key.

SUMMARY OF THE INVENTION

The present invention is intended to cope with the foregoing situation, and its prime object is to provide a method and device for video data playback and a recording medium capable of encrypting reproduced video data before it is fed to the decoder based on an encryption key that is immune to breaking.

Another object of the present invention is to provide a method and device for video data playback and a recording medium capable of simplifying the treatment of encryption keys used for the encryption of video data reproduced by the disk driver.

In order to achieve the above objectives, the present invention resides in a method of data decryption implemented by a second device which receives encrypted data which has been encrypted based on a prescribed encryption key S, which had been generated in a prescribed manner, and supplied by a first device, and decrypts the encrypted data by using the encryption key S, the method comprising the steps of: receiving the encrypted data which has been encrypted based on the encryption key S and supplied by the first device, and decrypting the encrypted data by using the encryption key S, the encryption key S being generated by implementing a step conducted by one of the first and second devices of receiving identification (will be termed "ID" hereinafter) data from other of the first and second devices, selecting public keys α and p relevant to the ID data, calculating a first datum C from the selected public keys α and p and a random number k1 based on formula $C=(\alpha^{k1} \mod p)$, and supplying the first datum C to the other device, a step conducted by the other device of calculating a second datum r from the public keys α and p and a random number k2, supplying the second datum r to the one device, and calculating the encryption key s from the first datum C and random number k2, and a step conducted by the one device of calculating the encryption key S from the second datum r supplied by the other device and the random number k1.

BRIEF DESCRIPTION OF THE DRAWINGS

FIG. 2 is a flowchart explaining the operation of the disk driver shown in FIG. 1;

FIG. 3 is a flowchart explaining the operation of the MPEG decoder board shown in FIG. 1;

FIG. 4 is a timing chart explaining the operation of the MPEG decoder board shown in FIG. 1;

FIG. 5 is a diagram showing the data flow in the personal computer of the first embodiment;

FIG. 11 is a diagram showing the data flow in the personal computer of the second embodiment;

FIG. 12 is a timing chart explaining the operation of the MPEG decoder board shown in FIG. 8; and FIG. 13 is a table showing an example of the key table which contains encryption data.

DESCRIPTION OF THE PREFERRED EMBODIMENTS

Figure 1:
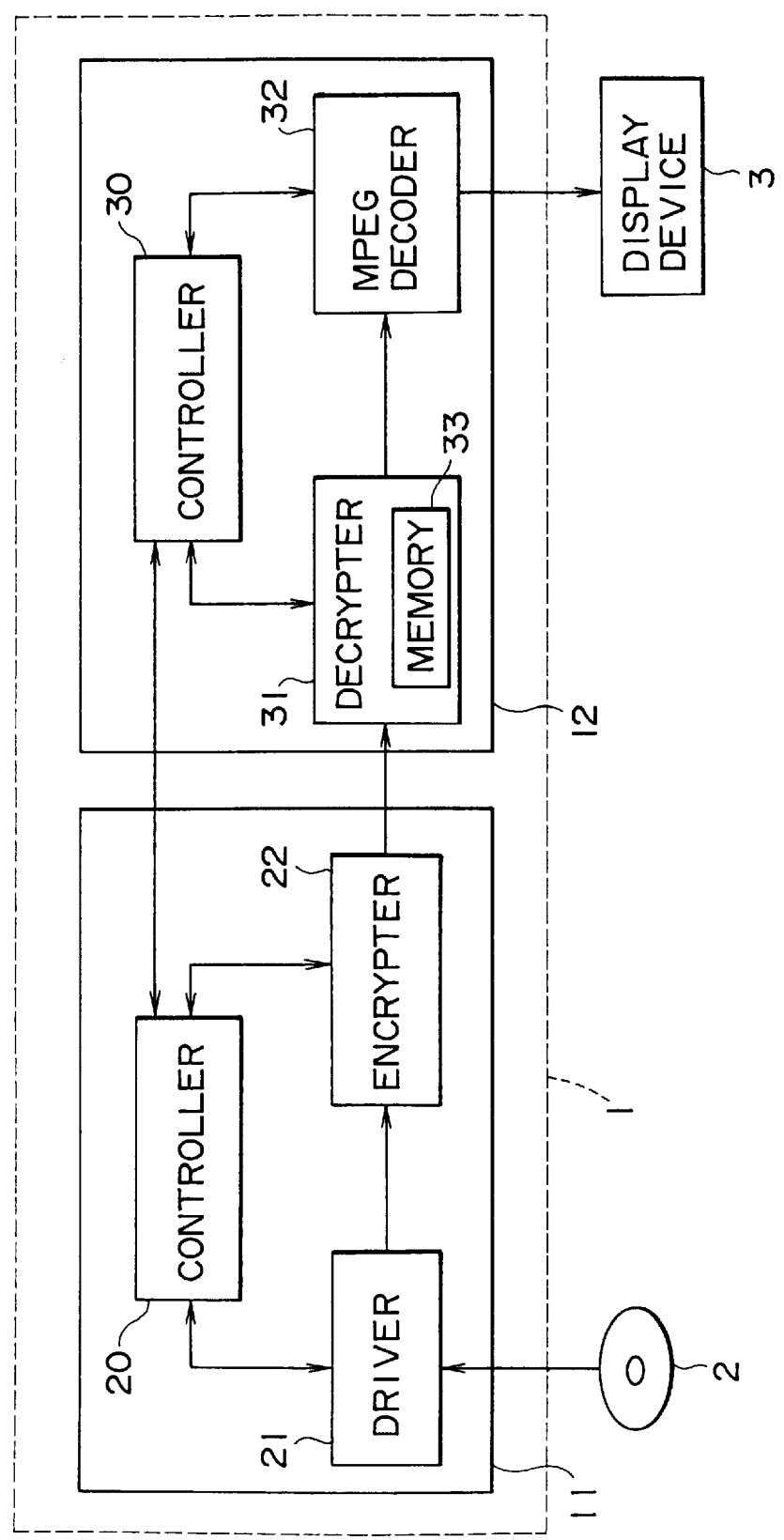
FIG. 1 is a block diagram showing the arrangement of a personal computer based on a first embodiment of this invention.

The personal computer based on the first embodiment of this invention will be explained with reference to FIG. 1. The personal computer 1 consists of a disk driver 11 which drives a digital video disk 2 of the ROM type (will be termed "DVD-ROM" hereinafter), and a MPEG decoder board 12 which receives data reproduced by the disk driver 11 and decodes the data. Video data (i.e., content of DVD-ROM) decoded by the MPEG decoder board 12 is fed to a display device 3, which displays the image of the decoded video data on the screen (not shown).

The disk driver 11 includes a driver 21 which drives the DVD-ROM 2 and retrieves recorded data from certain access points, an encryptor 22 which encrypts the video data reproduced by the driver 21, and a controller 20 which controls the driver 21 and encrypter 22. The DVD-ROM 2 has on its certain position (e.g., on the innermost track) a record of a key table which contains public keys $\alpha$, $\beta$ and p used for the encryption, and it has a record of video data encoded based on the MPEG scheme.

The MPEG decoder board 12 which is plugged in the personal computer 1 includes a decrypter 31 which decrypts the encrypted data from the encrypter 22. The decrypter 31 has a private key n which is necessary for the decryption process and includes a memory 33 which stores ID data used to identify the MPEG decoder board 12.

The video data decrypted by the decrypter 31 is fed to an MPEG decoder 32, by which it is decoded in compliance with the MPEG standard and delivered as video data. A controller 30 controls the decrypter 31 and MPEG decoder 32.

Next, the operation of the arrangement of the first embodiment shown in FIG. 1 will be explained with reference to the flowcharts of FIG. 2 and FIG. 3 for the disk driver 11 and MPEG decoder board 12, respectively, the timing chart of FIG. 4 showing the data transfer between the disk driver 11 and MPEG decoder board 12 and the data processing, and the diagram of FIG. 5 showing the data flow between the disk driver 11 and MPEG decoder board 12.

In playing back video data recorded on the DVD-ROM 2, the controller 30 of the MPEG decoder board 12 reads the ID data for the identification of MPEG decoder board out of the memory 33 and sends it to the controller 20 of the disk driver 11 in step S21 of FIG. 3. The ID "Request Challenge" is sent to the disk driver 11 as shown in FIG. 4.

In step S1 of FIG. 2, the controller 20 of the disk driver 11 receives the ID from the controller 30 of the MPEG decoder board 12. The controller 20 advances to step S2 and operates on the driver 21 to read out from the DVD-ROM 2 a public key set that is relevant to the ID received in step S1.

Specifically, multiple sets of public keys (key 1, key 2, key 3, etc.) used to encrypt the MPEG-coded video data retrieved from the DVD-ROM 2 and associated validity flags are recorded as a key table on a certain track of the DVD-ROM 2 as shown in FIG. 5. Valid public keys (key 1 and key 2) are indicated by validity flags marked by "o", while an invalid public key (key 3) is indicated by a validity flag marked by "x". The DVD-ROM 2 has its all public keys validated at the time of manufacturing, and some public keys (key 3 in the example of FIG. 5) which have been broken afterward by the third party have their corresponding flags invalidated at recording.

The public key sets key 1, key 2 and key 3 are made up of keys $\alpha 1, \beta 1, p1$, $\alpha 2, \beta 2, p2$, and $\alpha 3, \beta 3, p3$, respectively.

In case the key table of public keys and validity flags are recorded in the ROM area of the DVD-ROM 2, these data cannot be altered and therefore only the validity flags of the key table are rewritten when disks of substantially the same contents are produced as new version disks.

The controller 20 operates on the driver 21 to read the key table out of a certain track of the DVD-ROM 2. The controller 20 extracts from the key table the public key and associated flag relevant to the ID received in step S1. Specifically, authorized manufacturers of MPEG decoder boards 12 have been informed of ID data, and the manufacturer of DVD-ROMS 2 has recorded public keys selectively in correspondence to individual ID data. Consequently, the public key and flag relevant to the ID are detected in step S2.

The controller 20 verifies the validity of the flag of the public key in step S3. Specifically, in case the ID is found to be of a manufacturer of MPEG decoder board which produces illegitimate copies of DVD-ROM, the public key corresponding to that ID is invalidated. DVD-ROMs produced after the detection of the ID in question will have a record of an invalidated flag for that public key.

If the public key for the ID received in step S1 is found invalid, the process is aborted, and in this case the MPEG decoder board 12 cannot receive the reproduced video data of the DVD-ROM 2.

Having a valid public key at step S3 for the ID received in step S1, the controller 20 advances to step S4 to calculate Challenge (C) based on the following formula (1), and sends the result to the controller 30 of the MPEG decoder board 12 as shown in FIG. 4.

$$C = \alpha^{k1} \bmod p \qquad (1)$$

where $\alpha$ is a public key read out of the key table on the DVD-ROM 2, p is a prime number, and k1 is a selected random number. A generic term (A mod B) provides the residual resulting from the division of A by B. The above formula (1) is known to be a trapped function (discrete logarithmic problem), by which C is readily calculated from k1, whereas a function for calculating k1 from C is not known.

The Challenge (C) calculated as described above is sent to the controller 30 of the MPEG decoder board 12 as shown in FIG. 4. Namely, the controller 30 receives the Challenge (C) in step S22 of FIG. 3. The controller 30 advances to step S23, at which it selects a certain random number k2 and calculates digital signatures r and d based on the following formulas (2) and (3), and delivers the resulting values as Response(r,d) to the disk driver 11.

$$r = \alpha^{k2} \bmod p \qquad (2)$$

$$d = (C - n \cdot r) k2^{-1} \bmod (p-1) \qquad (3)$$

The random number k2 and value p-1 are related to each other in terms of prime factors.

The digital signatures r and d evaluated by the formulas (2) and (3) are sent as Response(r,d) to the controller 20 of the disk driver 11 as shown in FIG. 4. Receiving the Response(r,d) in step S5 of FIG. 2, the controller 20 advances to step S6 to verify the digital signatures r and d of the Response(r,d).

Specifically, the controller 20 calculates $\beta^r \cdot r^d$ and $(\alpha^c \bmod (p))$, and judges as to whether these values are equal, as shown in FIG. 4. In case the MPEG decoder board 12 is a legitimate device, the value of $\beta^r \cdot r^d$ calculated from the digital signatures r and d and public key $\beta$ is equal to the value of ($\alpha^c$ mod (p)) evaluated from the Challenge (C) and public keys $\alpha$ and p, as it is well known as El Gamal Signature Scheme (refer to article "A public key cryptosystem and a signature scheme based on discrete logarithms", in IEEE Transactions on Information Theory,21 (1985), pp.469–472). Otherwise, an imitated MPEG decoder board causes these values to differ. In this case the process is aborted, and video data retrieved from the DVD-ROM 2 is not delivered to the MPEG decoder board 12. The foregoing data transfer processing is represented by Key Exchange in FIG. 5.

Upon judging the equality of the two calculated values in step S6, the controller 20 advances to step S7 to calculate Session key (S) (i.e., Session key S in FIG. 5) based on the following formula (4).

$$S = r^{k1} \quad (4)$$

On the other hand, the controller 30 of the MPEG decoder board 12, which has calculated the Response(r,d) and returned the result to the disk driver 11 in step S23 of FIG. 3, advances to step S24 to calculate Session key (S') (i.e., Session key S' in FIG.5) from the Challenge (C) received in step S22 based on the following formula (5).

$$S' = C^{k2} \quad (5)$$

The Session key S calculated by the controller 20 of the disk driver 11 in step S7 of FIG. 2 and the Session key S' calculated by the controller 30 of the MPEG decoder board 12 in step S24 of FIG. 3 are expressed by the following formulas (6) and (7), respectively, and these values are equal normally. Namely, the disk driver 11 and MPEG decoder board 12 have a common encryption key.

$$\begin{aligned} S &= r^{k1} & (6) \\ &= (\alpha^{k2})^{k1} \bmod p \\ S' &= C^{k2} & (7) \\ &= (\alpha^{k1})^{k2} \bmod p \end{aligned}$$

This affair is known as Diffie-Hellman Key Exchange (refer to article "Multiuser cryptographic techniques", by W. Diffie and M. E. Hellman, in A FIPS Conference Proceedings, 45(1976), pp.102–112).

The controller 20 of the disk driver 11 advances to step S8 to drive the DVD-ROM 2 and deliver the Session key S evaluated in step S7 to the encrypter 22. The driver 21 retrieves recorded data from a certain position on the DVD-ROM 2. The encrypter 22 encrypts the data reproduced by the driver 21 based on the Session key S evaluated in step S7, and sends the resulting encrypted data to the MPEG decoder board 12:(shown by Encryption in FIG. 5).

Receiving the encrypted data from the encrypter 22 in step S25 of FIG. 3, the decrypter 31 of the MPEG decoder board 12 decrypts the encrypted data in step S26 by using the Session key S' evaluated in step S24:(shown by Decryption in FIG. 5). Based on the equality in value of the Session key S' and Session key S as mentioned above, the decrypter 31 carries out the decryption correctly. The decrypted video data (encoded video data) is fed to the MPEG decoder 32.

The MPEG decoder 32 decodes the MPEG-coded video data which has been decrypted by the decrypter 31, and feeds the resulting decoded video data to the display device 3:(shown by Decode in FIG. 5), which displays the image of the decoded video data on the screen (not shown).

The distribution of public keys is facilitated by imprinting them on the disk according to the foregoing first embodiment. Recording multiple sets of public keys enables the allotment of different keys to individual manufactures of MPEG decoder boards. Accordingly, even in case the private key of one board manufacturer is broken, other board manufacturers provided with different private keys are not affected, and the damage can be minimized. Moreover, the disk driver 11 can be treated easily since it does not need to keep a private key n and public keys $\alpha$, $\beta$ and p.

As modified arrangements of the personal computer 1, the controller 20 may be integrated with the encrypter 22 within the disk driver 11, and the controller 30 may be integrated with the decrypter 31 within the MPEG decoder board 12.

Identification of MPEG decoder board may be conducted on the part of the MPEG decoder board 12 by providing the ID data from the disk driver 11, instead of its conduction on the part of the disk driver 11 which receives the ID data from the MPEG decoder board 12 in the foregoing first embodiment.

Besides the playback of DVD-ROM described above, the present invention is also applicable to the retrieval of data from other recording mediums. It is possible for the controller 20 in the case of a RAM-type disk to invalidate a flag in response to a certain command signal.

Figure 6:
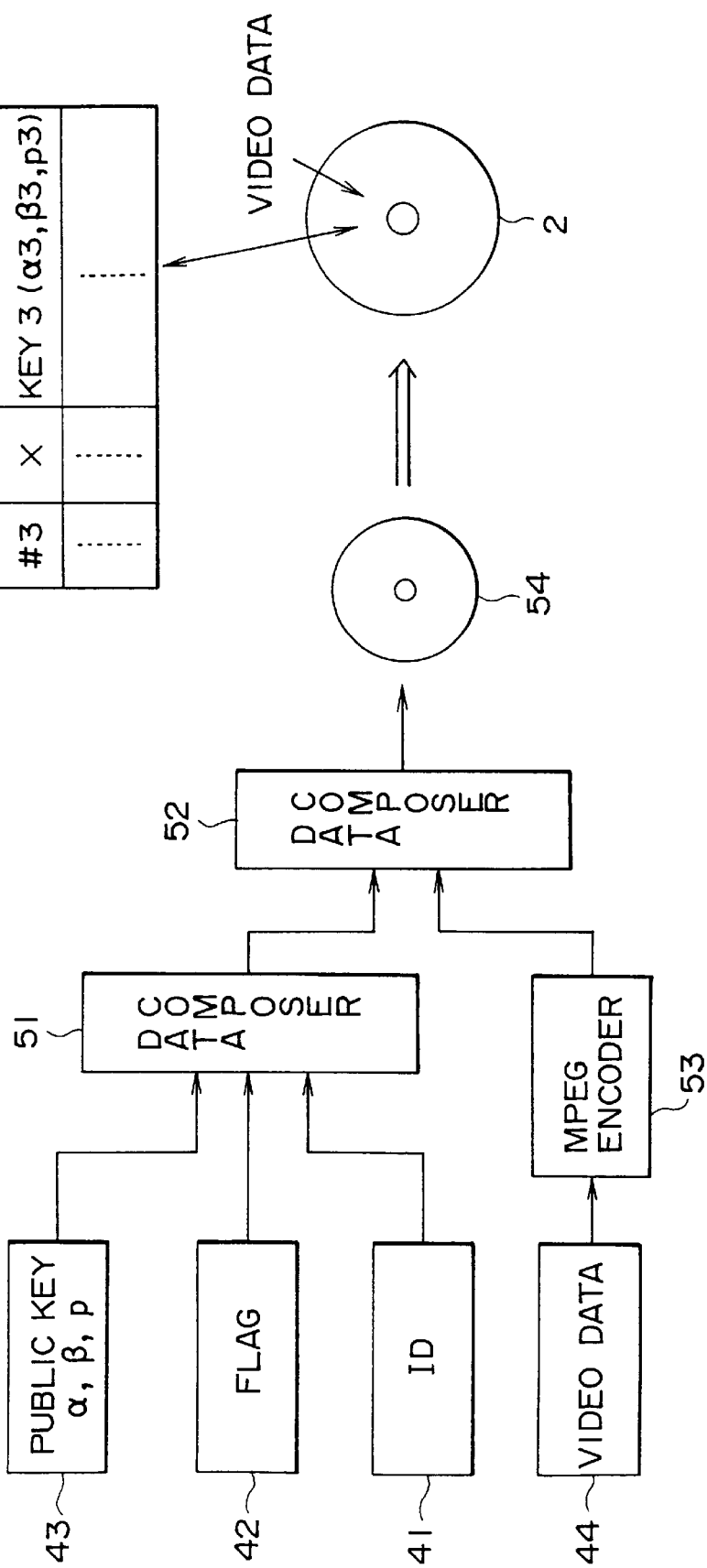
FIG. 6 is a block diagram showing the arrangement of an apparatus for producing DVD-ROMs based on an embodiment of this invention.

FIG. 6 shows the arrangement of a recording apparatus which records data on DVD-ROMs of the first embodiment. The apparatus includes a data composer 51 which merges ID data provided by an ID data source 41, flag data provided by a flag data source 42 and public key data $\alpha$, $\beta$ and p provided by a public key data source 43, and feeds the resulting key table data to another data composer 52.

A video data source 44 supplies video data to an MPEG encoder 53, which encodes the video data based on the MPEG scheme and feeds the encoded video data to the data composer 52. The data composer 52 merges the key table data from the data composer 51 and the encoded video data from the MPEG encoder 53. The resulting record data from the data composer 52 is recorded on a master disk 54. The master disk 54 is used to produce a large number of replica DVD-ROMs each having a record of a key table, which contains public keys and associated flags for multiple IDs, as well as a record of video data.

Next, the personal computer based on the second embodiment of this invention will be described, but first the apparatus for recording video data on DVD-ROMs pertinent to this embodiment will be explained.

Figure 7:
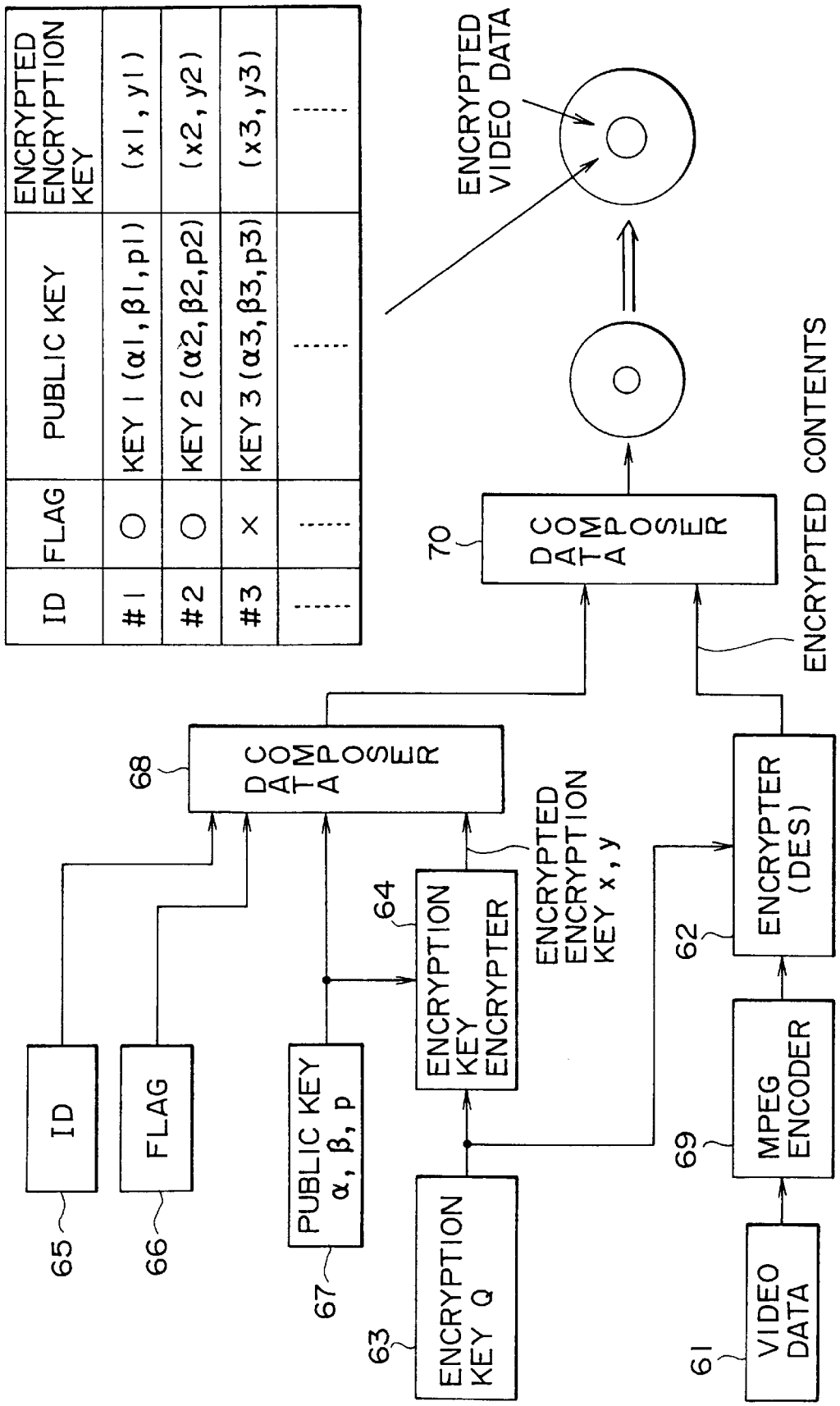
FIG. 7 is a block diagram showing the arrangement of an apparatus for producing DVD-ROMs based on another embodiment of this invention.

FIG. 7 shows the arrangement of the apparatus which records data on a DVD-ROM 72. This apparatus is designed to encrypt video data prior to recording on the DVD-ROM 72. Video data from a video data source 61 is fed to an MPEG encoder 69, which encodes the video data based on the MPEG scheme and delivers the encoded video data to an encrypter 62. The encrypter 62 also receives an encryption key Q from an encryption key data source 63, and it encrypts the encoded video data by using the encryption key Q based on the DES (Data Encryption Standard) scheme for example, and feeds the resulting encrypted video data to a data composer 70.

The encryption key Q is also supplied to an encryption key encrypter 64, which also receives public key data $\alpha$, $\beta$ and p from a public key data source 63. The encryption key encrypter 64 encrypts the encryption key Q by using the public key data $\alpha$, $\beta$ and p based on the following formulas (8) and (9) thereby to produce encrypted encryption keys x and y.

$$x = \alpha^{k3} \bmod (p) \quad (8)$$

$$y = Q\beta^{k3} \bmod (p) \quad (9)$$

where k3 is a selected random number.

The data composer 68 merges ID data provided by an ID data source 65, flag data provided by a flag data source 66, public key data $\alpha$, $\beta$ and p provided by a public key data source 67 and encrypted encryption keys x and y provided by the encrypter 64, and feeds the resulting key table data to the data composer 70. The data composer 70 merges the key table data from the data composer 68 and encrypted video data from the encrypter 62. The resulting record data from the data composer 70 is recorded on a master disk 71. The master disk 71 is used to produce a large number of replica DVD-ROMs 72 each having a record of a key table, which contains public keys $\alpha i$, $\beta i$ and pi and associated flags and encrypted encryption keys xi and yi for multiple IDs, as shown in FIG. 7, as well as a record of encrypted video data.

The personal computer based on the second embodiment of this invention for playing the DVD-ROM 72 which is recorded as described above will be explained with reference to FIG. 8.

The personal computer 80 consists of a disk driver 81 which drives the DVD-ROM 72 and a MPEG decoder board 82 which decodes video data reproduced by the disk driver 81. The decoded video data is fed to a display device 73, by which the image of the video data is displayed on the screen (not shown). The disk driver 81 and MPEG decoder board 82 have basically the same arrangement as those of the preceding embodiment shown in FIG. 1.

The disk driver 81 includes a driver 91 which drives the DVD-ROM 72 and retrieves recorded data from certain access points, an encryptor 92 which encrypts the reproduced data from the driver 91, and a controller 90 which controls the driver 91 and encrypter 92. The DVD-ROM 72 has on its certain position (e.g., on the innermost track) a record of a key table which contains public keys $\alpha$, $\beta$ and p and encrypted encryption keys x and y used for the encryption, and it has a record of video data encoded based on the MPEG scheme.

The MPEG decoder board 82 which is plugged in the personal computer 80 includes a decrypter 101 which decrypts the encrypted data from the encrypter 92. The decrypter 101 has a private key n which is necessary for the decryption process, and includes a memory 103 which stores ID data used to identify the MPEG decoder board 82.

The decrypted video data from the decrypter 101 is fed to another decrypter 104. An encryption key decrypter 105 receives the encrypted encryption keys x and y from the driver 91 of the disk driver 81, decrypts the encryption keys, and delivers the decrypted keys to the decrypter 104. The decrypter 104 decrypts the encrypted video data by using the decrypted keys. The resulting decrypted video data is fed to an MPEG decoder 102, by which it is decoded in compliance with the MPEG standard and delivered as video data. A controller 100 controls the decrypter 101, MPEG decoder 102, decrypter 104 and encryption key decrypter 105.

Figure 8:
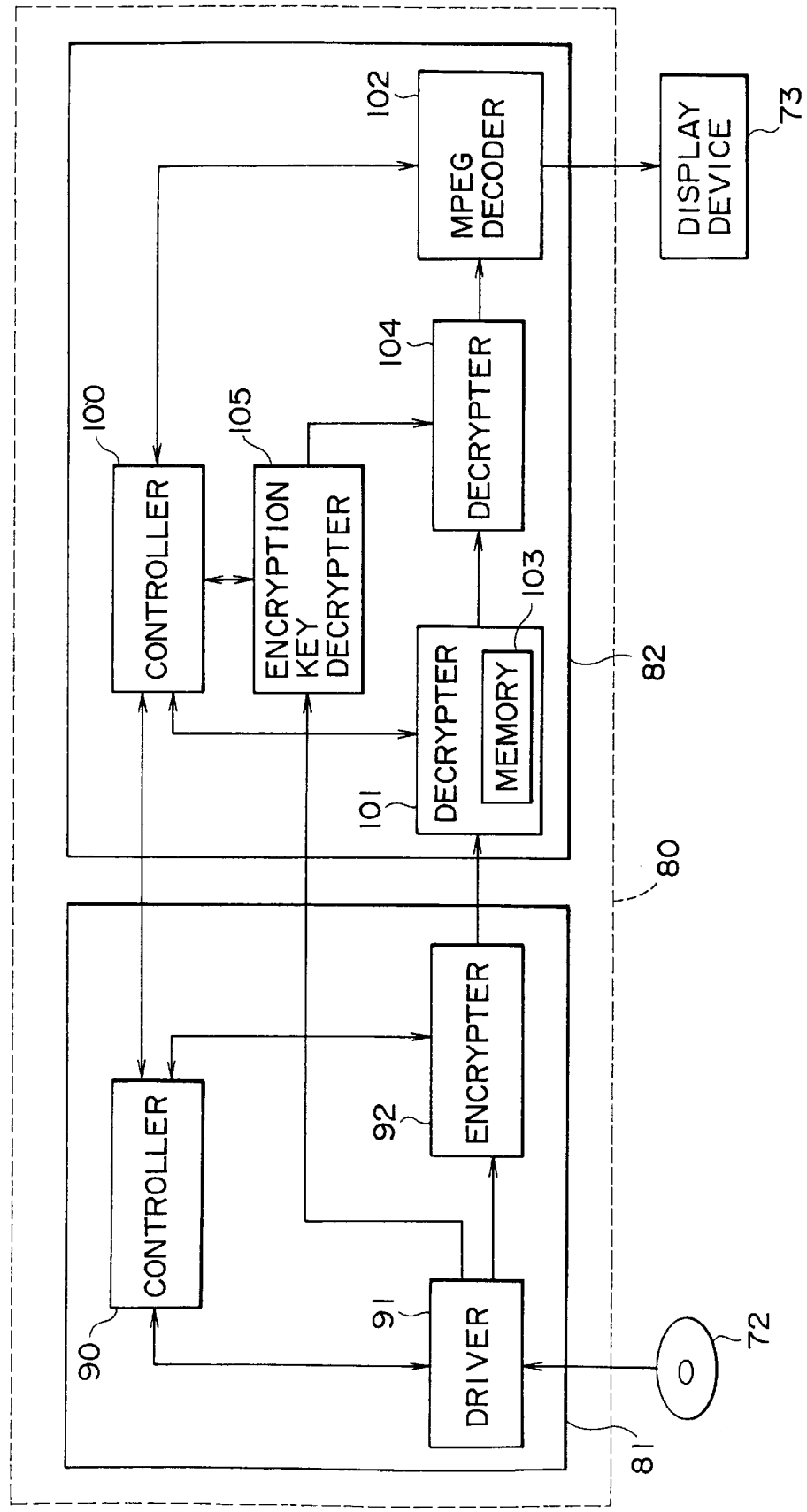
FIG. 8 is a block diagram showing the arrangement of a personal computer based on a second embodiment of this invention.

Next, the operation of the arrangement shown in FIG. 8 will be explained with reference to the flowcharts of FIG. 9 and FIG. 10 for the disk driver 81 and MPEG decoder board 82, respectively, the timing chart of FIG. 12 showing the data transfer between the disk driver 81 and MPEG decoder board 82 and the data processing, and the diagram of FIG. 11 showing the data flow between the disk driver 81 and MPEG decoder board 82.

Figure 10:
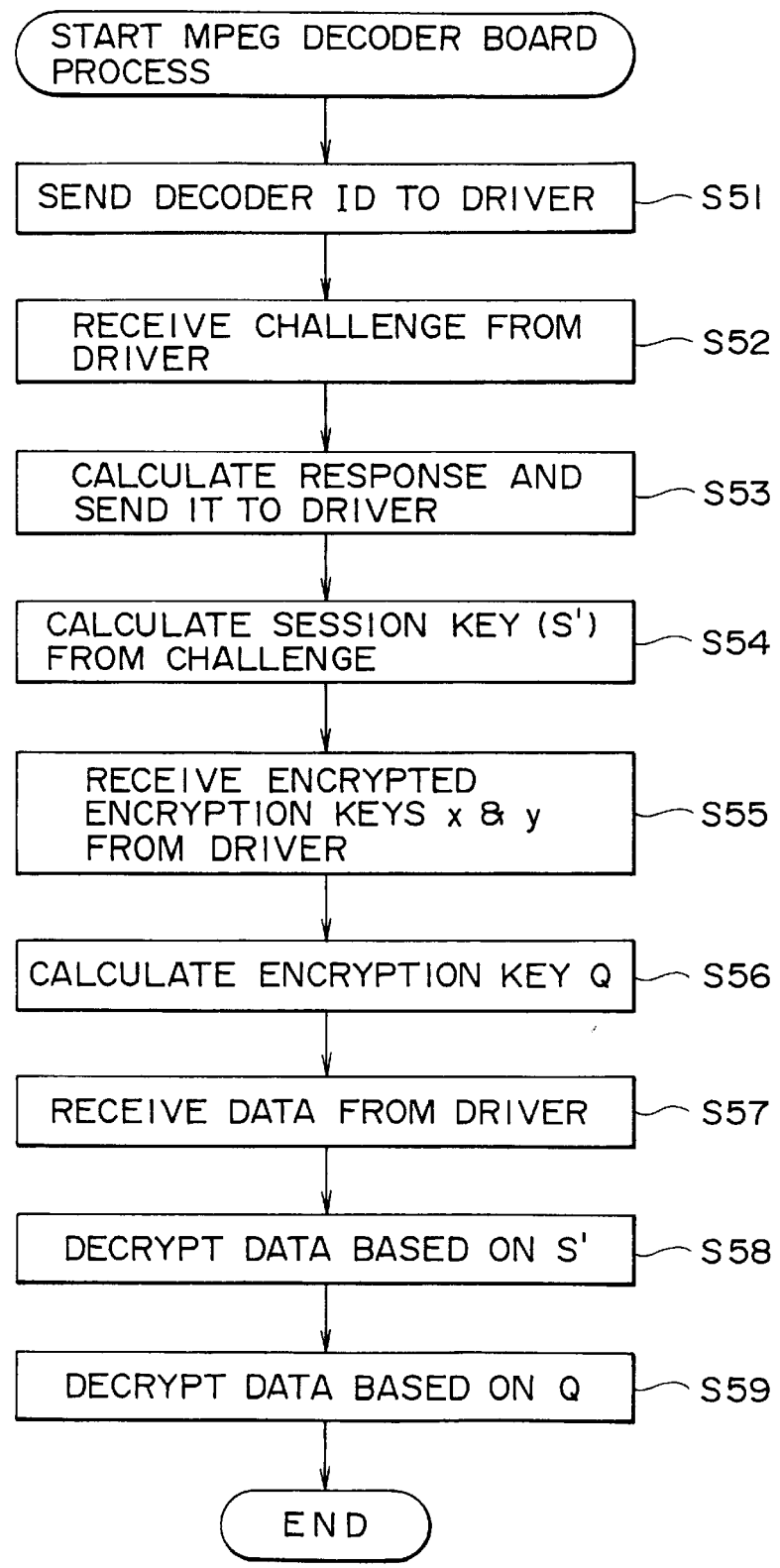
FIG. 10 is a flowchart explaining the operation of the MPEG decoder board shown in FIG. 8.

In playing back video data which is recorded on the DVD-ROM 2, the controller 100 of the MPEG decoder board 82 reads the ID data for the identification of MPEG decoder board out of the memory 103 and sends it to the controller 90 of the disk driver 81 in step S51 of FIG. 10. The ID "Request Challenge" is sent to the disk driver 81 as shown in FIG. 12.

Figure 9:
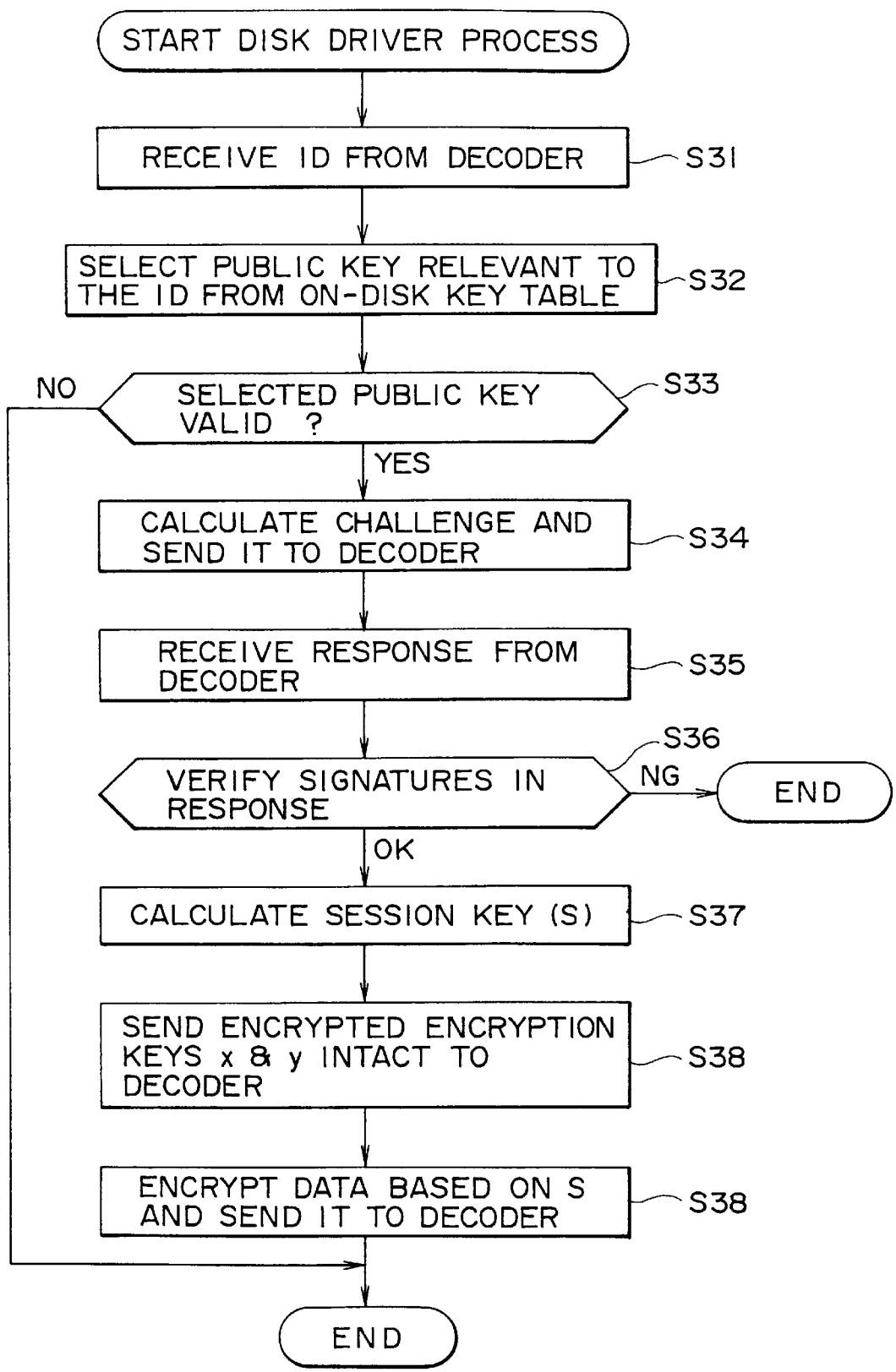
FIG. 9 is a flowchart explaining the operation of the disk driver shown in FIG. 8.

In step S31 of FIG. 9, the controller 90 of the disk driver 81 receives the ID data from the controller 100 of the MPEG decoder board 82. The controller 90 advances to step S32 and operates on the driver 91 to read out from the DVD-ROM 72 a public key set that is relevant to the ID received in step S31.

Specifically, multiple sets of public keys (key 1,key 2,key 3,etc.) used to encrypt the MPEG-coded video data retrieved from the DVD-ROM 72 and associated encrypted encryption keys ((x1,y1), (x2,y2), (x3,y3), etc.) and validity flags are recorded as a key table on a certain track of the DVD-ROM 72 as shown in FIG. 11. Valid public keys (key 1 and key 2) and encrypted encryption keys (x1,y1) and (x2,y2) are indicated by validity flags marked by "o", while an invalid public key (key 3) and encrypted encryption key (x3,y3) are indicated by a validity flag marked by "x". The DVD-ROM 72 has its all public keys and encrypted encryption keys Q validated at the time of manufacturing, and some public keys and encrypted encryption keys (key 3 and encryption key Q corresponding to x3,y3 in the example of FIG. 11) which have been broken afterward by the third party have their corresponding flags invalidated at recording.

The public key sets key 1, key 2 and key 3 are made up of keys $\alpha 1$, $\beta 1$, p1, $\alpha 2$, $\beta 2$, p2, and $\alpha 3$, $\beta 3$, p3, respectively.

In case the key table of public keys, encrypted encryption keys Q and validity flags are recorded in the ROM area of the DVD-ROM 72, these data cannot be altered and therefore only the validity flags of the key table are rewritten when disks of virtually the same contents are produced as new version disks.

The controller 90 operates on the driver 91 to read the key table out of a certain track of the DVD-ROM 72. The controller 90 extracts from the key table the public key, encrypted encryption key and associated flag relevant to the ID received in step S31. Specifically, authorized manufacturers of MPEG decoder boards 82 have been informed of ID data, and the manufacturer of DVD-ROMs 2 has recorded public keys and encryption keys Q encrypted by the public keys selectively in correspondence to individual ID data. Consequently, the public key and encrypted encryption keys x and y relevant to the ID are detected in step S32.

The controller 90 verifies the validity of the flag of the public key and encrypted encryption key in step S33. Specifically, in case the ID is found to be of a manufacturer of MPEG decoder board which produces illegitimate copies of DVD-ROM, the public key corresponding to that ID is invalidated. DVD-ROMs produced after the detection of the ID in question will have a record of an invalidated flag for those public key and encryption key Q.

If the public key for the ID received in step S31 is found invalid, the process is aborted, and in this case the MPEG decoder board 72 cannot receive the reproduced video data of the DVD-ROM 72. The foregoing data transfer is represented by Key Exchange in FIG. 11.

Having a valid public key at step S33 for the ID received in step S31, the controller 90 advances to step S34 to calculate Challenge (C) in the same manner as the first embodiment, and sends the result to the controller 100 of the MPEG decoder board 82.

The Challenge (C) calculated as described above is sent to the controller 100 of the MPEG decoder board 82 as shown in FIG. 11. Namely, the controller 100 receives the Challenge (C) in step S52 of FIG. 10. The controller 100 advances to step S53, in which it selects a certain random number k2 and calculates digital signatures r and d based on the formulas (2) and (3), and delivers the resulting values as Response(r,d) to the disk driver 81.

The digital signatures r and d evaluated by the formulas (2) and (3) are sent as Response(r,d) to the controller 90 of the disk driver 81 as shown in FIG. 12. Receiving the Response(r,d) in step S35 of FIG. 9, the controller 90 advances to step S36 to verify the digital signatures r and d of the Response(r,d).

Specifically, the controller 90 calculates $\beta^r \cdot r^d$ and ($\alpha^c$ mod (p)), and judges as to whether these values are equal, as shown in FIG. 11. In case the MPEG decoder board 82 is a legitimate device, the value of $\beta^r \cdot r^d$ calculated from the digital signatures r and d and public key β is equal to the value of ($\alpha^c$ mod (p)) evaluated from the Challenge (C) and public keys α and p, as in the case of the first embodiment. Otherwise, an imitated MPEG decoder board causes these values to differ. In this case the process is aborted, and video data retrieved from the DVD-ROM 72 is not delivered to the MPEG decoder board 82.

Upon judging the equality of the two calculated values in step S36, the controller 90 advances to step S37 to calculate Session key (S) (i.e., Session key S in FIG. 8) based on the formula (4).

On the other hand, the controller 100 of the MPEG decoder board 82, which has calculated the Response(r,d) and returned the result to the disk driver 81 in step S53 of FIG. 10, advances to step S54 to calculate Session key (S') (i.e., Session key S' in FIG. 11) from the Challenge (C) received in step S52 based on the formula (5).

The Session key S calculated by the controller 90 of the disk driver 81 in step S37 and the Session key S' calculated by the controller 100 of the MPEG decoder board 82 in step S54 are expressed by the formulas (6) and (7), respectively, and these values are equal normally. Namely, the disk driver 81 and MPEG decoder board 82 have a common encryption key.

The controller 90 of the disk driver 81 advances to step S38, and the driver 91 sends the encrypted encryption keys x and y (i.e., x,y (as is) in FIG. 11) read out of the DVD-ROM 72 intact to the MPEG decoder board 82.

Upon evaluating the Session key S', the controller 100 of the MPEG decoder board 82 advances to step S38 to control the encryption key decrypter 105 so that it receives the encrypted encryption keys x and y provided by the disk driver 81, and reads the private key n out of the memory 103 and sends it to the encryption key decrypter 105. The controller 100 further advances to step S56, in which the encryption key decrypter 105 decrypts the encrypted encryption keys x and y based on the following formula (10), and the decrypted encryption key Q is delivered to the decoder 104:(shown by Key Decryption in FIG. 11).

$$Q = (y/x^\eta) \bmod (p) \qquad (10)$$

Namely, the encryption key decrypter 105 decrypts the encryption key Q from the encrypted x and y by using the private key n and public key p.

After the disk driver 81 has sent the encrypted encryption keys x and y to the MPEG decoder board 82 in step S38, the controller 90 advances to step S39 thereby to operate on the driver 91 to retrieve video data from the DVD-ROM 72 and deliver the encrypted video data (encrypted by the encryption key Q) to the encrypter 92, and it also delivers the Session key S evaluated in step S37 to the encrypter 92. The encrypter 92 encrypts the retrieved and encrypted video data with the Session key S and sends the encrypted data to the MPEG decoder board 82:(shown by Encryption in FIG. 11).

Receiving the encrypted data from the encrypter 92 in step S55 of FIG. 10, the decrypter 101 of the MPEG decoder board 82 decrypts the encrypted data in step S56 by using the Session key S' evaluated in step S54:(shown by Decryption in FIG. 11). Based on the equality in value of the Session key S' and Session key S as mentioned above, the decrypter 101 carries out the decryption correctly. Consequently, the encryption by the Session key S is solved, and the resulting video data encrypted by the encryption key Q is fed to the decrypter 104.

In the subsequent step S59, the decrypter 104 decrypts the encrypted video data from the decrypter 101 by using the encryption key Q (i.e., decryption key) decrypted by the decrypter 105. Namely, the decryption process of DES is implemented in this embodiment:(shown by Decryption in FIG. 11). The encoded video data which has been decrypted is fed to the MPEG decoder 102.

The MPEG decoder 102 decodes the MPEG-coded video data which has been decrypted by the decrypter 104 and feeds the resulting decoded video data to the display device 73:(shown by Decode in FIG. 11), which displays the image of the decoded video data on the screen (not shown).

As described above, video data which is recorded by being encrypted on the disk is further encrypted by the disk driver 81 according to the second embodiment, and this dual encryption of video data makes it more difficult to copy the video disk illegally from data led out of the data path between the disk driver 81 and MPEG decoder board 82 as compared with the first embodiment.

Due to the encryption of the encryption key Q for the video data by using the public keys α and p that are used to evaluate the Session key S and the public key β that is used for the device legitimacy judgment (identification) process according to this embodiment, a smaller number of encryption keys are required for the encryption. Specifically, a possible manner of encryption of the encryption key Q by use of additional keys instead of the public keys α, β and p will compel an awkward treatment for the alteration (invalidation) of keys in the event of breaking. Whereas, using the public keys α, β and p commonly for the identification of Session key S and for the encryption of the encryption key which encrypts the video data, as in the case of the second embodiment, minimizes the number of keys.

As modified arrangements of the personal computer of the second embodiment, the controller 90 may be integrated with the encrypter 92 within the disk driver 81, and the controller 100 may be integrated with the decrypters 101, 104 and 105 within the MPEG decoder board 82.

The identification of MPEG decoder board may be conducted on the part of the MPEG decoder board 82 by providing the ID data from the disk driver 81, instead of its conduction on the part of the disk driver 81 which receives the ID data from the MPEG decoder board 82 in the foregoing second embodiment.

Besides the playback of DVD-ROM described above, the present invention is also applicable to the retrieval of data from other recording mediums. It is possible for the controller 90 in the case of a RAM-type disk to invalidate a flag in response to a certain command signal.

As variants of the first and second embodiments in which the encrypted encryption keys x and y are registered together with the public keys α, β and p in a single key table as shown in FIG. 6 and FIG. 7, the keys x and y may be registered in a separate key table in correspondence to the ID data as shown in FIG. 13.

The first and second embodiment may base the key generation on the use of unidirectional functions, which was proposed by the applicant of the present invention in U.S. patent application Ser. No. xxxxxxx.

Although the foregoing first and second embodiments deal with the exchange of encryption keys and the identification between the disk driver and decoder, the present invention is further applicable to other system in which, for example, a center device in place of the disk driver transmits data to a decoder through a network.

Although the foregoing first and second embodiments deal with video data, the present invention is further applicable to other data inclusive of audio data and program data.

Although the foregoing first and second embodiments employ MPEG-oriented encoders and decoders, the present invention is further applicable to encoders and decoders based on other coding schemes.

Although the foregoing first and second embodiments are arranged on a hardware basis, the present invention is further applicable to systems that are organized on a software basis by use of CPUs and memories.

According to the inventive method and device for data decryption described above, in which one device calculates an encryption key based on a digital signature r, which is calculated based on public keys $\alpha$ and p and random number k2 and provided by other device, and a random number k1, while the other device calculates the encryption key based on Challenge C and the random number k2, it makes difficult to break the encryption key, whereby illegal copy of data can surely be prevented.

According to the inventive method and device for device identification which is based on the comparison between a value calculated from digital signatures r and d and a prescribed public key $\beta$ and a value calculated from public keys $\alpha$ and p and Challenge C, it becomes possible to organize a secure device identification system.

According to the inventive recording medium, disk production method, and recording method and apparatus, in which public keys $\alpha$ and p used for the calculation of the encryption key S are recorded on the recording medium in correspondence to ID data used for the identification of the first or second device, it is possible to realize a recording medium which can surely prevent illegal copy of data.

According to the inventive disk production method and recording method and apparatus, in which a public key $\beta$ used for the identification of the first or second device is recorded in correspondence to ID data on the recording medium, it is possible to realize a recording medium which enables the organization of a secure device identification system.

According to the inventive recording medium, disk production method, and recording method and apparatus, in which the encryption keys x and y, which are derived from the encryption key Q for the encryption of data and encrypted based on the public keys $\alpha$ and p that are used for the calculation of encryption key S and the public key $\alpha$ that is used for the identification of the first or second device, are recorded in correspondence to the ID data for the identification of the first or second device, it is possible to realize a recording medium which can surely prevent illegal copy of data.

While the present invention has been described for the specific embodiments, it is not confined to these embodiments, but various modifications and applications are possible without departing from the present invention in its broader aspects.

What is claimed is:

1. A method of data decryption implemented by a second device which receives encrypted data which has been encrypted based on a prescribed encryption key S, which had been generated in a prescribed manner, and supplied by a first device, and decrypts the encrypted data by using the encryption key S, said method comprising the steps of:

receiving encrypted data which has been encrypted based on the encryption key S and supplied by said first device; and decrypting the encrypted data by using the encryption key S, said encryption key S being generated by implementing:

a step conducted by one of said first and second devices of receiving identification data from other of said first and second devices, selecting public keys $\alpha$ and p relevant to the identification data, calculating a first datum C from the selected public keys $\alpha$ and p and a random number k1 based on formula C=($\alpha^{k1}$ mod p), and supplying the first datum C to said other device;

a step conducted by said other device of calculating a second datum r from the public keys * and p and a random number k2, supplying the second datum r to said one device, and calculating the encryption key S from the first datum C and the random number k2; and a step conducted by said one device of calculating the encryption key S from the second datum r supplied by said other device and the random number k1.

2. A data decryption method according to claim 1, wherein device identification is implemented between said first and second devices by implementing:

a step conducted by said other device of calculating a third datum d from the first datum C, the second datum r, the public key p, the random number k2 and a private key n, and supplying the resulting third datum d to said one device; and a step conducted by said one device of comparing a value which is calculated from the second datum r and the third datum d supplied by said other device and a prescribed public key $\beta$ with a value which is calculated from the public keys $\alpha$ and p and the first datum C.

3. A data decryption method according to claim 2, wherein said data comprises data encrypted based on an encryption key Q, and wherein said second device receives from said first device encrypted data, which has been encrypted based on the encryption key S, and encrypted encryption keys x and y which have been produced by decrypting the encryption key Q based on the public keys $\alpha$, $\beta$ and p, decrypts the encrypted data by using the encryption key S, decrypts the encrypted encryption keys x and y by using the private key n and the public key p thereby to produce the decrypted encryption key Q, and decrypts the data by using the decrypted encryption key Q.

4. A data decryption method according to claim 1, wherein said public keys $\alpha$ and p are data retrieved from a recording medium.

5. A device for data decryption which receives encrypted data which has been encrypted based on a prescribed encryption key S, which had been generated in a prescribed manner, and supplied by a first device, and decrypts the encrypted data by using the encryption key S, said device comprising:

a receiver which receives encrypted data which has been encrypted based on the encryption key S and supplied by said first device; and a first decrypter which decrypts the encrypted data by using the encryption key S, said encryption key S being generated by implementing:

a step conducted by one of said first device and said data decryption device of receiving identification data from other of said first device and said data decryption device, selecting public keys $\alpha$ and p relevant to the identification data, calculating a first datum C from the selected public keys $\alpha$ and p and a random number k1 based on formula $C=(\alpha^{k1} \mod p)$, and supplying the first datum C to said other device;

a step conducted by said other device of calculating a second datum r from the public keys * and p and a random number k2, supplying the second datum r to said one device, and calculating the encryption key S from the first datum C and the random number k2; and a step conducted by said one device of calculating the encryption key S from the second datum r supplied by said other device and the random number k1.

6. A data decryption device according to claim 5, wherein device identification is implemented between said first device and said data decryption device by implementing:

a step conducted by said other device of calculating a third datum d from the first datum C, the second datum r, the public key p, the random number k2 and a private key n, and supplying the resulting third datum d to said one device; and a step conducted by said one device of comparing a value which is calculated from the second datum r and the third datum d supplied by said other device and a prescribed public key $\beta$ with a value which is calculated from the public keys $\alpha$ and p and the first datum C.

7. A data decryption device according to claim 6, wherein said encrypted data comprises data encrypted based on an encryption key Q, and wherein said data decryption device comprises:

a receiver which receives from said first device encrypted data, which has been encrypted based on the encryption key S, and encrypted encryption keys x and y which have been produced by decrypting the encryption key Q based on the public keys $\alpha$, $\beta$ and p;

a first decrypter which decrypts the encrypted data by using the encryption key S;

a key decrypter which decrypts the encrypted encryption keys x and y based on the private key n and the public key p thereby to produce the decrypted encryption key Q; and a second decrypter which decrypts the encrypted data by using the decrypted encryption key Q.

8. A data decryption device according to claim 5, wherein said public keys $\alpha$ and p are data retrieved from a recording medium.

9. A method of device identification implemented by one for other of a first device which encrypts data based on a prescribed encryption key S thereby to produce encrypted data and a data decryption device which receives the encrypted data and decrypts the encrypted data by using the encryption key S, said method comprising:

a step conducted by one of said first device and said data decryption device of receiving identification data from other of said first device and said data decryption device, selecting public keys $\alpha$ and p relevant to the identification data, calculating a first datum C from the selected public keys $\alpha$ and p and a random number k1 based on formula $C=(\alpha^{k1} \mod p)$, and supplying the first datum C to said other device;

a step conducted by said other device of calculating second data r and d from the public keys $\alpha$ and p and a random number k2, supplying the second data r and d to said one device;

a step conducted by said one device of comparing a value which is calculated from the second data r and d supplied by said other device and a prescribed public key $\beta$ with a value which is calculated from the public keys $\alpha$ and p and the first datum C.

10. A recording medium played with a playback apparatus which consists of a first device which encrypts data based on a prescribed encryption key S thereby to produce encrypted data and a data decryption device which decrypts the encrypted data supplied by said first device by using the encryption keys, said recording medium having a record of data which is generated by implementing:

a step of producing a key table by making correspondence of public keys $\alpha$ and p, which are used to calculate the encryption key S, to identification data which are used to identify said first device or said data decryption device; and a step of recording said data and said key table.

11. A recording medium according to claim 10, wherein said key table includes a public key $\beta$, which is used to identify said first device or said data decryption device, in correspondence to said identification data.

12. A recording medium according to claim 10, wherein said data comprises data encrypted based on an encryption key Q, and wherein said key table includes encryption keys x and y, which are produced by encrypting the encryption key Q based on the public keys $\alpha$, $\beta$ and p, in correspondence to said identification data.

13. A method of data recording for a recording medium which is played with a playback apparatus which consists of a first device which encrypts data based on a prescribed encryption key S thereby to produce encrypted data and a data decryption device which decrypts the encrypted data supplied by said first device by using the encryption key S, said method comprising:

a step of producing a key table by making correspondence of public keys $\alpha$ and p, which are used to calculate the encryption key S, to identification data which are used to identify said first device of said data decryption device; and a step of recording said data and said key table.

14. An apparatus for data recording for a recording medium which is played with a playback apparatus which consists of a first device which encrypts data based on a prescribed encryption key S thereby to produce encrypted data and a data decryption device which decrypts the encrypted data supplied by said first device by using the encryption key S, said apparatus comprising:

means of producing a key table by making correspondence of public keys $\alpha$ and p, which are used to calculate the encryption key S, to identification data which are used to identify said first device or said data decryption device; and means of recording said data and said key table.

15. A recording medium played with a playback apparatus which consists of a first device which encrypts data based on a prescribed encryption key S thereby to produce encrypted data and a data decryption device which decrypts the encrypted data supplied by said first device by using the encryption key S, said recording medium having a record of data which is generated by implementing:

a step of producing a key table by making correspondence of a public key $\beta$, which is used to identify said first device or said data decryption device, to identification data; and a step of recording said data and said key table.

16. A method of data recording for a recording medium which is played with a playback apparatus which consists of a first device which encrypts data based on a prescribed encryption key S thereby to produce encrypted data and a data decryption device which decrypts the encrypted data supplied by said first device by using the encryption key S, said method comprising:

a step of producing a key table by making correspondence of a public key $\beta$, which is used to identify said first device or said data decryption device, to identification data; and a step of recording said data and said key table.

17. A record apparatus for a recording medium which is played with a playback apparatus which consists of a first device which encrypts data based on a prescribed encryption key S thereby to produce encrypted data and a data decryption device which decrypts the encrypted data supplied by said first device by using the encryption key S, said recording apparatus comprising:

means of producing a key table by making correspondence of a public key β, which is used to identify said first device or said data decryption device, to identification data; and means of recording said data and said key table.

18. A recording medium played with a playback apparatus which consists of a first device which encrypts data, which has been encrypted based on an encryption key Q, by using a prescribed encryption key S thereby to produce encrypted data and a data decryption device which decrypts the encrypted data supplied by said first device by using the encryption key S and further decrypts the resulting data by using the encryption key Q, said recording medium having a record of data which is generated by implementing:

a step of encrypting data based on the encryption key Q thereby to produce encrypted data;

a step of producing a key table by making correspondence of encryption keys x and y, which are produced by encrypting the encryption key Q based on public keys α and p which are used to calculate the encryption key S and a public key β which is used to identify said first device or said data decryption device, to identification data which are used to identify said first device or said data decryption device; and a step of recording the data encrypted based on the encryption key Q and said key table.

19. A method of data recording for a recording medium which is played with a playback apparatus which consists of a first device which encrypts data, which has been encrypted based on an encryption key Q, by using a prescribed encryption key S thereby to produce encrypted data and a data decryption device which decrypts the encrypted data supplied by said first device by using the encryption key S and further decrypts the resulting data by using the encryption key Q, said method comprising:

a step of encrypting data based on the encryption key Q thereby to produce encrypted data;

a step of producing a key table by making correspondence of encryption keys x and y, which are produced by encrypting the encryption key Q based on public keys α and p which are used to calculate the encryption key S and a public key β which is used to identify said first device or said data decryption device, to identification data which are used to identify said first device or said data decryption device; and a step of recording the data encrypted based on the encryption key Q and said key table.

20. A record apparatus for a recording medium which is played with a playback apparatus which consists of a first device which encrypts data, which has been encrypted based on an encryption key Q, by using a prescribed encryption key S thereby to produce encrypted data and a data decryption device which decrypts the encrypted data supplied by said first device by using the encryption key S and further decrypts the resulting data by using the encryption key Q, said apparatus comprising:

an encrypter which encrypts data based on the encryption key Q thereby to produce encrypted data;

means of producing a key table by making correspondence of encryption keys x and y, which are produced by encrypting the encryption key Q based on public keys α and p which are used to calculate the encryption key S and a public key β which is used to identify said first device or said data decryption device, to identification data which are used to identify said first device or said data decryption device; and means of recording the data encrypted based on the encryption key Q and said key table.

21. A method of producing a record disk which is played with a playback apparatus which consists of a first device which encrypts data based on a prescribed encryption key S thereby to produce encrypted data and a data decryption device which decrypts the encrypted data supplied by said first device by using the encryption key S, said method comprising:

a step of producing a key table by making correspondence of public keys α and p, which are used to calculate the encryption key S, to identification data which are used to identify said first device or said data decryption device;

a step of recording said data and said key table on a master disk; and a step of producing a record disk from said master disk.

22. A method of producing a record disk which is played with a playback apparatus which consists of a first device which encrypts data based on a prescribed encryption key S thereby to produce encrypted data and a data decryption device which decrypts the encrypted data supplied by said first device by using the encryption key S, said method comprising:

a step of producing a key table by making correspondence of a public key β, which is used to identify said first device or said data decryption device, to identification data;

a step of recording said data and said key table on a master disk; and a step of producing a record disk from said master disk.

23. A method of producing a record disk which is played with a playback apparatus which consists of a first device which encrypts data, which has been encrypted based on an encryption key Q, by using a prescribed encryption key S thereby to produce encrypted data and a data decryption device which decrypts the encrypted data supplied by said first device by using the encryption key S and further decrypts the resulting data by using the encryption key Q, said method comprising:

a step of encrypting data based on the encryption key Q thereby to produce encrypted data;

a step of producing a key table by making correspondence of encryption keys x and y, which are produced by encrypting the encryption key Q based on public keys * and p which are used to calculate the encryption key S and a public key β which is used to identify said first device or said data decryption device, to identification data which are used to identify said first device or said data decryption device;

a step of recording the data encrypted based on the encryption key Q and said key table on a master disk; and a step of producing a record disk from said master disk.

* * * * *